(12) United States Patent
Glittenberg et al.

(10) Patent No.: US 7,147,753 B2
(45) Date of Patent: Dec. 12, 2006

(54) STARCH COMPOSITION AND THE USE THEREOF IN WET-END OF PAPER PREPARATION

(75) Inventors: Detlev Glittenberg, Krefeld (DE); Peter Leonhardt, Krefeld (DE)

(73) Assignee: Cerestar Holding B.V., Sas Van Gent (NL)

( * ) Notice: Subject to any disclaimer, the term of this patent is extended or adjusted under 35 U.S.C. 154(b) by 387 days.

(21) Appl. No.: 10/439,303

(22) Filed: May 16, 2003

(65) Prior Publication Data

US 2004/0025744 A1    Feb. 12, 2004

Related U.S. Application Data

(62) Division of application No. 09/884,420, filed on Jun. 20, 2001, now abandoned.

(30) Foreign Application Priority Data

Jun. 20, 2000  (GB) ................................. 0014946.8

(51) Int. Cl.
  *D21H 11/00*  (2006.01)
(52) U.S. Cl. ...................... 162/175; 162/135; 162/158; 106/206.1
(58) Field of Classification Search ................. 162/175, 162/135, 158; 106/206.1
  See application file for complete search history.

(56) References Cited

U.S. PATENT DOCUMENTS 6,413,372 B1 * 7/2002 Maliczyszyn et al. ...... 162/175

FOREIGN PATENT DOCUMENTS

| EP | 0 257 338 A2 | 3/1988 |
| WO | 9964677 | * 12/1999 |

* cited by examiner

*Primary Examiner*—Mark Halpern
(74) *Attorney, Agent, or Firm*—Fitch, Even, Tabin & Flannery

(57) ABSTRACT

The present invention relates to compositions of starch. The compositions consist of an anionic and a cationic starch wherein at least one of the starches is waxy. The compositions are surprisingly not resulting in an agglomerated product when cooked. The compositions are used in paper or cardboard preparation. The compositions are cooked and added at the wet end of the paper production process. This results in a high possible addition level and the use of the size press is abolished. The resulting paper and board are shown to have better characteristics than the paper and board prepared with the same components which have not been mixed prior to addition but which are added separately.

11 Claims, 2 Drawing Sheets

STARCH COMPOSITION AND THE USE THEREOF IN WET-END OF PAPER PREPARATION

This application is a Divisional of application No. 09/884,420 filed on 20 Jun. 2001, abandoned.

TECHNICAL FIELD

The present invention relates to starch compositions containing two differently modified starches. More specifically, the compositions contain a mixture of an anionic and a cationic starch. After cooking the compositions are used in paper or cardboard preparation. The resulting paper and board are shown to have better characteristics than the paper and board prepared with the same components which have not been mixed and cooked together but which are added separately. Moreover, the prior mixing makes the addition of the components easier. In addition it was demonstrated that waxy starches perform better than regular starches.

BACKGROUND OF THE INVENTION

In the production of paper, cellulose is pulped to form a slurry, the slurry is then applied to a screen to orient the fibres the liquid is subsequently drained. From the screen the paper is squeezed between rollers to further reduce the water content and after a final drying, paper is obtained. The strength of the paper is dependent on the nature of the pulp. Virgin pulp typically gives a stronger paper than pulp from a re-pulped paper of the same quality. Furthermore the strength of the paper decreases with every recycling. Therefore there is an interest in finding additives, which could increase the strength of the paper.

It is known that the strength of paper can be increased by the addition of additives either before the size press or in the pulp i.e. at the wet end of paper production process.

As fillers or binders starch or polyhydroxy high molecular weight polymers can be used.

Often these molecules have further been modified by the addition of ionic groups to increase the binding capacity.

The starch or polymer is added to provide certain desirable quality characteristics. To increase especially the physical properties of the paper sheet different methods are available.

As mentioned above there are two stages in the paper production process where starch or polymer is added; the addition of cooked cationic starch (with different charge levels) or polymer is to the fibres in the very beginning of the process (wet-end), or it is at the stage of the size press, which is installed in the paper machine after the wet-end part and the first dryer section. Both methods have their advantages but they also suffer from limitations and disadvantages.

Addition of the starch or polymer in the wet-end stage is only effective if the material is retained, in one way or another by the fibres, which form the basis of the paper or board. In order to achieve this, the starch or polymers, are substituted by cationic or anionic groups. The maximum amount of polymer that can be added is limited by the runnability of the product.

The drawback of this is that in order to obtain optimum characteristics of the final material often a higher level of addition of the starch or polymer would be needed. For the cationic starch it is the maximum addition level of usually 2 to 2.5% that forms the natural barrier for further optimisation. Higher addition levels, needed for further strength improvement, cause severe runnability problems due to overcharging effects.

In order to add more of the starch or polymer it is also possible to add the material at a later stage when the paper sheet has been formed and dried. At this stage however the paper or board has to be re-wetted which calls for a further drying. Furthermore, contrary to the addition at the wet-end stage the addition at a later stage does not give a homogeneous product the added polymer and/or starch will not be able to fully penetrate in the pre-formed material.

The application of native starch, that is usually only enzymatically or thermochemically converted, at the size press stage has slightly different limitations. The main disadvantage is the reduction of the machine speed caused by the re-wetting of the paper during this application. Additionally due to the required drying this approach consumes a lot of extra energy.

Another barrier especially for high grammage paper qualities is the penetration of the starch into the paper. In some cases, the sizing solution is unable to penetrate into the middle of the sheet and impart beneficial strength properties.

Therefore in practice on many paper machines, producers combine the application of starch at the wet-end stage with that at the size press stage to obtain desired paper properties.

For the aforementioned reasons, a replacement of the size press by higher starch and/or polymer addition levels in the wet-end would help to significantly increase productivity. To realise this, a product is needed, that allows high addition levels to create the needed strength properties and which provides sufficient self-retention.

To adapt to this demand systems have been developed wherein combinations of oppositely charged starches and/or polymers are used. A starch or polymer is added at the beginning of the wet-end stage or it is mixed with the stock solution and the second oppositely charged polymer or starch is then added in the flow spreader or on the paper wire table. The combination of these two components then precipitates and this improves both retention and total amount, which can be added. The second component of this combination can also be added at the size press stage, but due to the low retention of the first component this is somewhat less efficient.

In practice this system has too date not resulted in a process wherein the size press is replaced. Too date the addition of the two oppositely charged components is performed in two steps and the components are often prepared separately.

This is for example illustrated by European Patent EP 0 282 415, wherein a process is described for the manufacturing of paper characterized by the fact that in the wet-end at two or several separate points one (or several) cationic starch(es) and one (or several) anionic starch(es) other than a starch phosphate are added. According to the examples the starches are added in pregelatinised form, which is obtained by cooking the starches just prior to addition.

International patent application WO 96/05373 describes a process of applying a polyhydroxy high molecular weight polymer or like material to a substrate. The process comprises adding to a solution of such material in anionic form a flocculent of oppositely charged form in order to insolubilise such material and thereafter applying such insolubilised material to said substrate.

Japanese patent application JP 05230792 (abstract) describes the spraying of an aqueous dispersion of anionic and cationic starch over the web fibres during paper production. The starches are indicated to be ungelatinised.

International patent application WO 99/64677 discloses the use in the preparation of paper of a combination of 95% starch and 5% of a synthetic fixative. In addition the starch and the fixative are added separately to the stock.

Japanese patent application JP 08296193 (abstract) discloses the use of a mixture of cationic and anionic starches in paper making. Only regular corn and tapioca starches have been used.

There is therefore a need to improve this system wherein both the addition is made easier and the size press can be abolished.

SUMMARY OF THE INVENTION

The present invention discloses a composition which when added to paper or board increases the strength characteristics and at the same time the composition is easy to add. The present invention discloses a composition consisting of an anionic and a cationic starch, and wherein at least one of the starches is a waxy starch. Such mixtures are found to be suitable for addition to the wet-end of the paper production process.

The present invention also discloses a method for treating the compositions with the aim of making them suitable for application in paper. Such a treatment consists of cooking the compositions batch-wise or through direct steam injection.

The present invention further discloses the application of a composition consisting of an anionic and a cationic starch and wherein at least one of the starches is a waxy starch in the wet-end of the paper preparation.

The compositions are cooked and added to the thick stock of the paper machine.

Furthermore, the present invention discloses paper or board with addition levels of between 1 and 10% (w/w) of the starch composition, preferably between 2 an 8% and more preferably between 4 and 6%. The paper containing such amounts of starch compositions of the present invention gives better paper strength properties then those, which are usually obtained by use of a combination of size press and wet-end starch, and wherein the cationic and anionic starches have been separately cooked and added.

Consequently, in a further embodiment the present invention also discloses a method, which enables paper producers to replace both, the size press and the conventional wet-end starch.

A preferred embodiment of the present invention discloses a process for paper making which does not employ a size press.

DETAILED DESCRIPTION OF THE INVENTION

Figure 1:
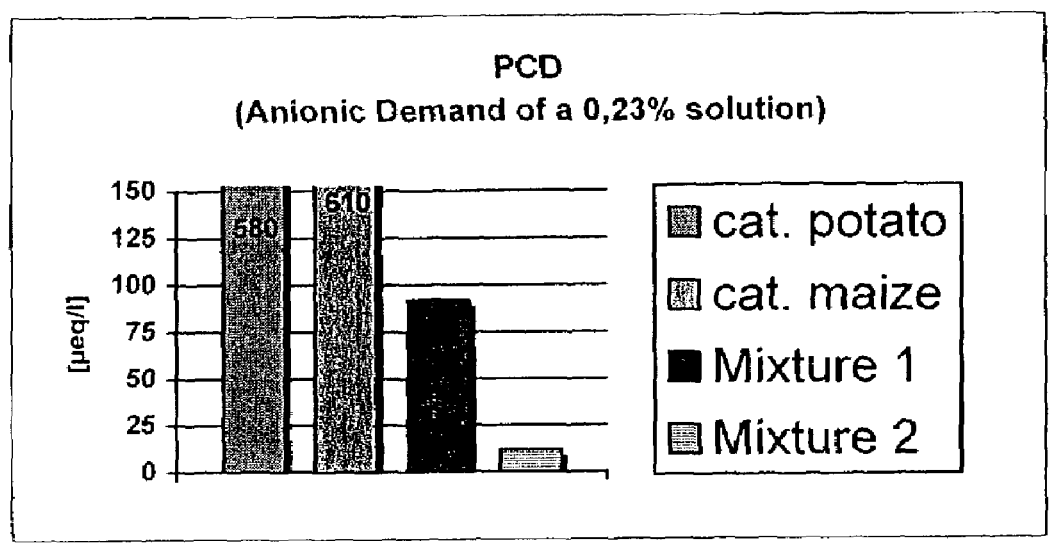
FIG. 1 shows the anionic demand of cationic potato starch and maize starch compared with mixtures of the present invention (Example 1).

The present invention discloses compositions of polymers, specifically starches. Although in general one of the polymers is preferably a starch and the other may be a starch or a synthetic polymer there is a preference for starch. The compositions contain a cationic and an anionic starch, wherein at least one of the starches is waxy. The compositions comprising the two types of starches generally contain between 1:10 and 10:1 (w/w) of each of the starches. The ratio of the two components is chosen in such a way that the overall charge is slightly cationic. This secures the binding of the starch mixture to the anionic fibres/filler matrix in the wet end of the paper or board production process. One aspect for determining the overall charge is the ratio of the starches on the basis of their weight the other is that the overall charge depends on the degree of substitution with cationic or anionic groups.

As basic starch it is possible to use all types of normally available starches i.e. wheat, corn, potato, tapioca and pea starches.

The starches used in the present compositions are cationic starches mixed with anionic waxy starches such as oxidised maize or modified waxy starches which have been treated with maleic or succinic anhydride or anionic starches mixed with cationic waxy starch.

It was surprisingly found that the mixtures comprising anionic and cationic starches were very easy to handle. Contrary to the normal process for paper preparation wherein the cationic and anionic components are added and prepared separately, which requires two preparation and storage units, the mixtures if cationic and anionic starches were cooked together and added at one point to the paper machines without any problems. Even more surprising was the finding that best performance as determined by characteristics of the paper sheets was obtained when at least one of the two starches was derived form a waxy starch. It should be noted that although mixtures of two starches have been used it is of course possible to use more different starches as long as the overall charge remains slightly cationic i.e there should be a slight anionic demand.

The compositions of the present invention are dry mixtures and can thus easily be stored before use. The compositions can also be kept as slurry for some time before cooking.

Thus compositions of the present invention are used after cooking up and they are added at one point. The present invention also discloses a method for treating the starch compositions with the aim of making them suitable for application in paper.

Such a treatment consists of cooking the compositions batch-wise or through direct steam injection. With the use of the compositions of the present invention the process only requires one addition and preparation point. Which makes the process much cheaper.

It was further found that the amount of polymer, which can be added in this way is much higher than the usual amounts which are added. Specifically, addition levels of between 1 and 10% (w/w) of the starch composition, preferably between 2 an 8% and more preferably between 4 and 6% have been reached. This results in a paper with better physical characteristics than when lower amounts are added. Note that even when equal amounts of polymers are added the quality of the paper based on the compositions of the present invention is higher.

The present invention discloses a new method for making paper or board. The method, which makes use of a composition consisting of an anionic starch and a cationic starch, wherein at least one of the starches is a waxy starch, makes possible the preparation of paper or board without the use of a size press.

The compositions are applied after cooking to the thick stock of the paper machine.

Furthermore, the present invention discloses paper or board with addition levels of between 1 and 10% (w/w) of the starch mixture, preferably between 2 an 8% and more preferably between 4 and 6%. The paper containing such amounts of mixtures of the present invention give better paper strength properties then those, which are usually obtained by use of a combination of size press and wet-end starch.

Consequently, the present invention also discloses a method, which enables paper producers to replace both, the size press and the conventional wet-end starch. The present invention discloses a process for paper making which does not employ a size press.

The compositions mentioned above are cooked in slurry form with concentrations of up to 10% dry substance. The cooking can be provided by indirect heating (batch cooking with 30 min. holding time) or through direct steam injection (jet cooking at 120° C.). The obtained starch or starch/polymer paste can be diluted to its desired addition level, which is usually 2.5 to 5%. It can be stored for several hours provided that a sufficient stirring and a temperature of about 60 to 70° C. are maintained.

When added to the fibres during the paper process, addition levels of 5% and higher can be realised replacing the size press and the wet-end starch (if used). As a consequence higher production capacities can be realised due to lower steam consumption. The paper has not to be dried after the re-wetting process in the size press. Additionally investment respectively maintenance costs for the size press fall away.

Example 1 shows that the compositions of the present invention are prepared having slight anionic demand with typical values of lower than 200 µeq preferably, lower than 100 µeq/l. Such mixtures show a very good retention on the fibres. This means that the starches have slight cationic excess when compared with the cationic starches normally used in paper production. This serves to avoid overcharging at relatively high addition levels which are up to 10% (w/w). Note also that due to the composition of the mixtures the final product which, is added shows molecular weight distribution which, is shifted to somewhat higher values.

Example 2 shows the application of mixtures of cationic and anionic starches in the preparation of paper on lab scale equipment. It has to be underlined that the maximum addition rate for a cationic potato starch in the aforementioned lab evaluations was limited to 2%. A higher dosage or lower substituted starches led to overcharging effects or insufficient paper properties.

Tables 1 and 2 show that higher dosage is possible using cationic/anionic starch mixtures when compared with conventional cationic starch. The paper produced with mixtures according to the present invention has higher internal bond strength a higher breaking length and an increased bursting strength.

In example 3 it is demonstrated that the effect found on lab scale is also found on plant scale.

Although the addition of starch mixtures was tested with anionic and cationic starch mixtures it was found that there was an outspoken advantage when anionic waxy starch or cationic waxy starches were used.

Example 4 demonstrates that the paper characteristics are even better when one of the two starches is derived from a waxy starch.

The advantages of the use of the compositions of the present invention can be summarised as follows. Due to the balanced charge situation of the composition product, more starch can be applied to the fibres without causing overcharging effects. Additionally, the simultaneous cooking forms complexes with a different molecular weight than the single components. In summa this provides a superior behaviour that enables paper producers to replace their size press by an easy to use single component system.

The following examples further illustrate the present invention they allow to understand the advantages and are in no way meant to limit the invention.

EXAMPLES

Example 1

Starch Compositions

The anionic demand of the starch mixtures of the present invention was determined and compared with the anionic demand of the normal cationic starches. FIG. 1 discloses the charge situation of two cooked compositions (starch/starch) consisting of 60% (w/w) anionic waxy starch (modified with maleic anhydride) and 40% (w/w) cationic maize starch (D.S. (degree of substitution): 0.042) or 40% (w/w) cationic potato starch (D.S.: 0.040).

The quantities and charge densities of the two components of the mixtures have to be selected in a way that provides the final cooked complex of the two polymers with a slight cationic net charge, which is high enough to enable the complex to be retained in the anionic fibre/filler matrix. The cationic charge has to be sufficient for retention, but on the other hand low enough to avoid overcharging of the system at higher addition rates than 2.5%.

Figure 2:
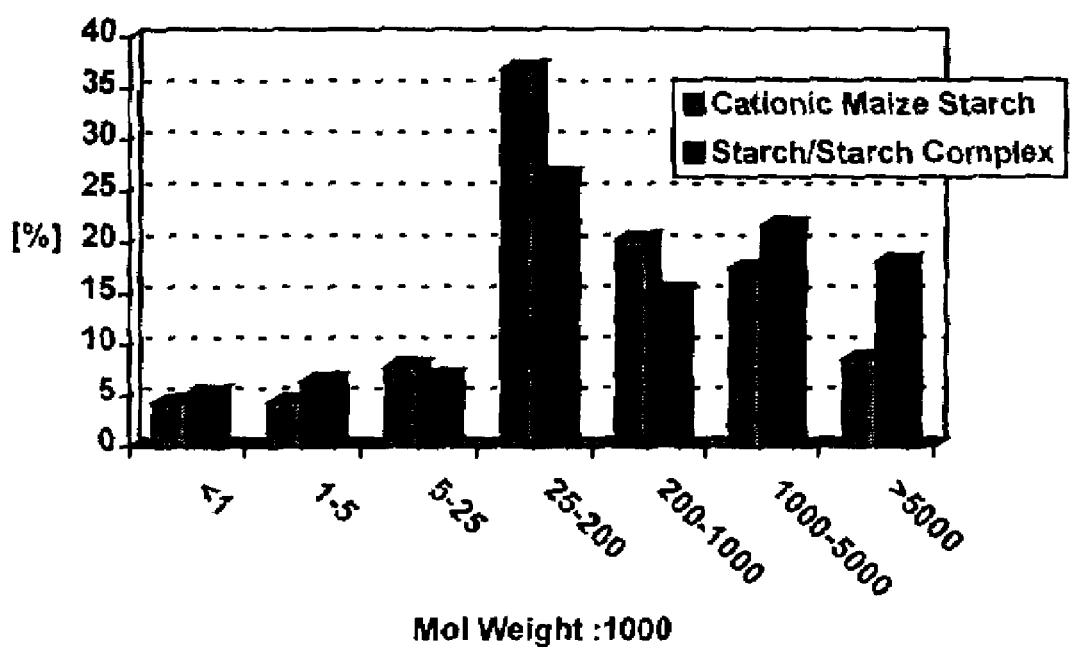
FIG. 2 shows the different molecular weight distributions of the mixtures according to the present invention compared to a typical wet-end starch (Example 1).

FIG. 2 shows the different molecular weight of the mixture compared to a typical wet-end starch.

Example 2

Paper Preparation with Compositions Containing Cationic and Anionic Starches

Several lab investigations were performed. Lab sheets were made on a TECHPAP lab sheet former (retention tester) and were investigated with respect to properties according to standardised international paper testing methods.

Method for lab sheet forming.

Fibres are prepared in a mixing device according to the recipe of the furnish being used on the paper machine with a consistency of 0.5 to 1.0% dry substance. Depending on the paper quality some filler such as carbonate and some recycled fibres (coated and uncoated) are additionally applied.

A defined volume (depending on the grammage of the paper) of this composition is transferred to the TECHPAP retention tester. This equipment consists of a baffled cylinder with an adjustable stirrer and a valve to release the pulp suspension onto a wire situation. Under normal conditions the charge and therefore the PCD response has to be fixed.

The stirrer is set to 1000 rpm stirring speed to simulate the shear forces of a paper machine circuit. According to the paper machine process all additives such as the cooked starch composition, polyacrylamide and other process chemicals as well as further amounts of water (to achieve a total volume of 1000 ml) are added in a well-defined sequence, before this suspension is released onto the wire, which has a diameter of 15 cm. During all trials the composition is added as the first component to have a sufficient reaction time.

Beneath the wire a vacuum is applied after a certain holding time to remove the water from the suspension. This process simulates the dewatering of a paper machine.

The wet sheet is then removed from the wire and is then dried and pressed at 140° C. for 5 min.

The white water of the sheet forming process is analysed regarding cationic/anionic demand (PCD), turbidity and iodine staining.

The cationic demand of the white water gives an indication about the overall charge negative avoiding any overcharging of the paper machine circuit.

Turbidity is measured with a photometer and gives an indication for the total retention of the fibre and filler material. A high turbidity figure therefore indicates a high amount of fibres, filler or fines in the white water, which means a poor retention.

Iodine staining is also determined with a photometer at 585 nm wavelength. The starch in the white water forms a complex with the iodine solution, which results in a blue staining of the starch. This can be used to determine the starch self-retention. A high figure indicates (depending on the calibration curve) a high amount of free starch in the white water. This starch was not successfully retained on the fibres and can therefore not increase paper strength.

The compositions have shown excellent self-retention figures indicated by low iodine staining values. Filler and fines retention was always on the same level compared to a conventional wet-end starch.

After being stored for 24 hours under standardised, DIN method conditions, the sheets are tested according to the following methods.

| Physical testing: | |
| --- | --- |
| Breaking Load, Breaking Length and elongation | DIN EN ISO 1924-2 |
| CMT (Concora Medium Test) | DIN EN ISO 7263 |
| SCT (Strip Compression Test) | DIN 54518 |
| Burst strength | DIN 53141 part I |
| Internal Bond or Plybond strength | DIN 54516 |
| Ash | DIN 54370 |

For the lab evaluation standard cationic wet-end starches with different degrees of substitution were manually mixed with anionic starches such as oxidised maize or waxy starches modified with maleic or succinic anhydride. The mixtures were then batch cooked at 96° C. (holding time 30 min.)

In two paper systems ("Waste" and "Coating base paper") the aforementioned mixtures were tested in comparison to cationic reference starches. The results clearly show that higher addition levels are possible whereas cationic starches reach their limits quite fast. The lab sheets were tested after drying at 140° C. for 5 min. and storing under standard climate for 24 hours. Size press application was not simulated on lab scale.

Reference starch is standard product QUAB with D.S. 0.035.

TABLE 1

Lab results for Coating Base paper

| | | Reference 2% Cationic Potato Starch | Composition 3% Anionic/ Cationic Starch | Composition 5% Anionic/ Cationic Starch |
| --- | --- | --- | --- | --- |
| Internal Bond | [N] | 177 | 285 | 275 |
| Breaking Length | [m] | 4600 | 4800 | 5500 |
| Ash | [%] | 4.3 | 5.0 | 4.6 |

TABLE 2

Lab results for Fluting (100% recycled fibres)

| | | Reference 2% Cationic Potato Starch | Composition 3% Anionic/ Cationic Starch | Composition 5% Anionic/ Cationic Starch |
| --- | --- | --- | --- | --- |
| Bursting Strength | [kPa] | 291 | 288 | 329 |
| SCT | [N/m] | 3564 | 3492 | 3844 |
| Internal Bond | [N] | 150 | 197 | 218 |
| CMT | [N] | 220 | 214 | 227 |
| Breaking Length | [m] | 4200 | 3700 | 4600 |
| Ash | [%] | 8.0 | 8.3 | 8.6 |

It has to be underlined that the maximum addition rate for a cationic potato starch in the aforementioned lab evaluations was limited to 2%. A higher dosage or lower substituted starches led to overcharging effects or insufficient paper properties.

Tables 1 and 2 show that higher dosage is possible using cationic/anionic starch mixtures when compared with conventional cationic starch. The paper produced with mixtures according to the present invention have a higher internal bond strength a higher breaking length and an increased bursting strength.

Starch/Polymer Mixtures

Starch/polymer mixtures were also tested under lab conditions with similar results. These mixtures mainly consisted of anionic starch (oxidised; and succinic anhydride modified) and cationic PAM or PVAM. The following results were obtained in a lab evaluation:

| | | Blank | Composition 1 2% Oxidised Starch + PAM | Composition 2 2% Succinilated Starch + PAM |
| --- | --- | --- | --- | --- |
| PCD White Water (cationic demand) | [µeq/l] | 61 | 120 | 66 |
| Breaking Length | [m] | 3500 | 4000 | 3700 |
| CMT | [N] | 147 | 167 | 162 |
| Ash | [%] | 9.2 | 10.3 | 10.5 |

The aforementioned mixtures consist of anionic starch (oxidised) and cationic polyacrylamide. They were cooked together by direct steam injection (jet cooking) at 125° C.

Example 3

Experiments were performed on large-scale equipment to confirm the lab scale tests. Results are shown in Table 3.

TABLE 3

Results of a full scale machine trial

| | | Reference 5% Size Press Starch + 0.9% Wet-End Starch | Trial 2.5% Composition of Anionic + Cationic Starch |
|---|---|---|---|
| Machine Speed | [m/min] | 225 | 250 |
| Machine Production | [t/hour] | 9.1 | 11.06 |
| Scott Bond | [units] | 195 | 255 |
| Tensile Strength | [m] | 5,400 | 6,900 |
| Ash | [%] | 8.3 | 7.4 |

This trial was performed on a twin wire Fourdrinier machine producing coating base paper. The grammage was 190 g/m². The starch mixture was cooked by steam injection Oet cooking) at 125° C. and dosed at the machine chest (same addition point like the conventional wet-end starch).

Table 3 shows that the addition of 2.5% of the composition according to the present invention gives a machine and product performance which is above that when size press starch and wet-end starch are used. The ash content is lower and the paper strength is increased moreover the machine speed is increased or at least not negatively influenced.

Example 4

An additional series of tests was performed using different mixtures of cationic and anionic starch. The following mixtures have been used.

C☆Bond® 06931=40% cationic potato starch 35804/60% anionic waxy starch

C☆Bond® 05930=40% cationic waxy starch/60% anionic corn starch

C☆Bond® 05931=40% cationic corn starch 05906/60% anionic corn starch

These products have been tested with up to 5% addition rate.

C☆Bond is a registered trademark from Cerestar. The codes are used to distinguish between different compositions as indicated.

Trials were performed on a lab sheet former obtainable from the company TECHPAP.

Addition sequence of the different products to the sheet former was as follows:
1. Paper pulp (1% d.s.)
1a). C☆Bond 05930, 05931 or 06931 (2.5%, 4% or 5%)
2. Water dilution step after 30 s.
3. 0.4% BMA® after 70 s.
4. 0.4% PAC (PolyaluminiumChloride) after 75 s.
5. 0.6% Hi Cat® 160 after 80 s.
6. 0.2% Vector® after 85 s.
7. Sheet forming after 90 s.

For trial 8 PAC was reduced to 0.2%

Sheets were air conditioned for 24 h before Ash, Breaking Length, Internal Bond, Scott Bond and formation were measured The results of the test are summarised in Table 4.

Two products performed best in this lab sheet study; C☆Bond 06931 and C☆Bond 05930.

Sheet formation was significantly improved (synergistic effect for strength)

Internal strength figures were improved by almost 80% compared to the reference starch system. Ash retention was kept on a constant level.

Addition rate between 2% and 4% appears to be reasonable without any overcharging effects.

The tests also demonstrate that the starch mixtures based on at least one waxy starch component perform better than other starches.

This conclusion has subsequently been confirmed in further tests.

TABLE 4

| Sample | | 1 ref | 2 | 2a | 3 | 4 | 5 | 2 ref | 6 | 7 | 8* |
|---|---|---|---|---|---|---|---|---|---|---|---|
| Ref. (HCat/Vector) | [% dosing] | 0.6/0.2 | | | | | | 0.6/0.2 | | | |
| C*Bond 06931 | [% dosing] | | 2.5 | 2.5 | 4 | | | | | | |
| C*Bond 05930 | [% dosing] | | | | | 2.5 | 4 | | | | 5 |
| C*Bond 05931 | [% dosing] | | | | | | | | 2.5 | 4 | |
| dosing time for starch | sec. | 80/85 | 0 | 80 | 0 | 0 | 0 | 80/85 | 0 | 0 | 0 |
| | | | | Wet End | | | | | | | |
| Turbidity | ext @ 585 mm | 0.133 | 0.121 | 0.110 | 0.128 | 0.178 | 0.137 | 0.152 | 0.321 | 0.204 | 0.297 |
| I2 staining (unfiltered) | ext @ 585 mm | 0.078 | 0.102 | 0.114 | 0.138 | 0.113 | 0.212 | 0.070 | 0.176 | 0.302 | 0.316 |
| I2 staining (filtered) | ext @ 585 mm | 0.028 | 0.033 | 0.029 | 0.055 | 0.067 | 0.15 | 0.031 | 0.133 | 0.213 | 0.188 |
| Dewatering time | [s] | 0.52 | 0.66 | 0.55 | 0.66 | 0.65 | 0.67 | 0.56 | 0.72 | 0.77 | 0.74 |
| POD Cationic demand | [µeq/l] p-DADMAC | 5.3 | 3.8 | 3.9 | 3.7 | 4.1 | 3.1 | 4.3 | 4.9 | 4.9 | 4.5 |
| SZP | mV | −4.1 | −3.1 | −3.1 | −2.1 | −3.3 | −2.2 | −4.0 | −4.0 | −3.8 | −0.7 |
| | | | | Physical-Testing | | | | | | | |
| Grammage | [g/m²] | 115 | 115 | 115 | 116 | 113 | 114 | 115 | 116 | 115 | 117 |
| Scott Bond | | 80 | 89 | 115 | 155 | 132 | 135 | 71 | 95 | 119 | 180 |
| Internal Bond | [N] | 137 | 192 | 176 | 227 | 189 | 226 | 134 | 177 | 197 | 246 |
| Breaking Length | [m] | 2304 | 3084 | 2798 | 3655 | 3222 | 3571 | 2246 | 3228 | 3484 | 3908 |
| Ash | [%] | 8 | 8 | 9 | 8 | 7 | 8 | 8 | 6 | 7 | 7 |

The invention claim is:

1. A method for producing paper or board, said method including a wet-end step, comprising:
    a) cooking a composition consisting of an anionic and a cationic starch and wherein at least one of the starches is a waxy starch and wherein the anionic starch is modified with maleic or succinic anhydride,
    b) adding the cooked composition of the previous step to the wet-end of the paper production process, and
    c) drying the paper or board.

2. A method according to claim 1 wherein in the composition of step a) the ratio of anionic to cationic starch is between 1:10 and 10:1 (w/w).

3. The process according to claim 1, wherein said composition consists of an anionic and a cationic starch having an anionic demand (PCD) of less than 200 μeg/l.

4. The process according to claim 1, wherein the anionic starch is oxidized waxy starch modified with maleic or succinic anhydride.

5. The process according to claim 1, wherein 1 to 10% (w/w) of said composition is used.

6. Paper or board comprising a composition which consists of an anionic and a cationic starch, wherein at least one of the starches is a waxy starch, and wherein the anionic starch is modified with maleic or succinic anhydride and wherein in said composition the ratio of anionic to cationic starch is between 1:10 and 10:1 (w/w).

7. The paper or board product according to claim 6, wherein said composition consists of an anionic and a cationic starch having an anionic demand (PCD) of less than 200μeg/l.

8. The paper or board product according to claim 6, wherein the anionic starch is oxidized waxy starch modified with maleic or succinic anhydride.

9. The paper or board product according to claim 6, wherein said composition is present in an amount of 1 to 10% (w/w).

10. The paper or board product according to claim 6, wherein said composition is present in an amount of between 2 and 8%.

11. The paper or board product according to claim 6, wherein said composition is present in an amount of between 4 and 6%.

* * * * *